(12) United States Patent
Gray

(10) Patent No.: US 11,812,826 B2
(45) Date of Patent: Nov. 14, 2023

(54) SHOE FIT MEASURING DEVICE

(71) Applicant: Heeluxe, LLC, Goleta, CA (US)

(72) Inventor: Geoffrey Gray, Santa Barbara, CA (US)

(73) Assignee: Heeluxe, LLC, Goleta, CA (US)

( * ) Notice: Subject to any disclaimer, the term of this patent is extended or adjusted under 35 U.S.C. 154(b) by 642 days.

(21) Appl. No.: 17/063,994

(22) Filed: Oct. 6, 2020

(65) Prior Publication Data

US 2021/0116235 A1 Apr. 22, 2021

Related U.S. Application Data

(60) Provisional application No. 62/916,152, filed on Oct. 16, 2019.

(51) Int. Cl.
| | |
|---|---|
| *A43D 1/02* | (2006.01) |
| *A43D 1/08* | (2006.01) |
| *G01L 1/14* | (2006.01) |
| *G01L 1/20* | (2006.01) |
| *G01L 19/00* | (2006.01) |
| *A43D 1/06* | (2006.01) |
| *G06Q 50/04* | (2012.01) |

(52) U.S. Cl.
CPC .............. *A43D 1/027* (2013.01); *A43D 1/06* (2013.01); *A43D 1/08* (2013.01); *G01L 1/14* (2013.01); *G01L 1/20* (2013.01); *G01L 19/0092* (2013.01); *G06Q 50/04* (2013.01)

(58) Field of Classification Search
USPC ........................................ 33/3 R, 3 A, 3 B, 6
See application file for complete search history.

(56) References Cited

U.S. PATENT DOCUMENTS

| | | | | |
|---|---|---|---|---|
| 1,364,468 | A * | 1/1921 | Wilson .................. | A43D 3/025 12/124 |
| 2,043,649 | A * | 6/1936 | Bliss ........................ | A43D 1/06 33/3 A |
| 6,192,593 | B1 * | 2/2001 | Borchers .................. | A43D 1/06 33/542.1 |
| 8,763,261 | B1 | 7/2014 | Kemist | |
| 9,514,487 | B2 * | 12/2016 | Wilkinson ............... | A43D 1/06 |
| 9,836,883 | B2 | 12/2017 | Tran | |
| 10,575,594 | B2 * | 3/2020 | Kim ...................... | G01B 11/285 |
| 10,729,356 | B2 * | 8/2020 | Nino ........................ | A43B 3/44 |
| 10,820,664 | B2 * | 11/2020 | Bishoff .................... | A43D 1/06 |

(Continued)

FOREIGN PATENT DOCUMENTS

| | | | | |
|---|---|---|---|---|
| CN | 108851351 | A | * 11/2018 | |
| CN | 110384308 | A | * 10/2019 | ............. A43D 1/027 |

(Continued)

OTHER PUBLICATIONS

PCT International Search Report, dated Jul. 2, 2021.

*Primary Examiner* — Christopher W Fulton
(74) *Attorney, Agent, or Firm* — Kevin Schraven; Anooj Patel; Hankin Patent Law, APC

(57) ABSTRACT

A shoe fit measuring device, comprising: a replica human foot portion; pressure sensors; and distance gauges. The pressure sensors and distance gauges are configured to determine whether shoes being fit tested are the correct size. The replica human foot and the sensors may be configured to be inserted into the shoes being fit tested so that fit measurements may be taken.

19 Claims, 11 Drawing Sheets

(56) References Cited

U.S. PATENT DOCUMENTS

2012/0316827 A1   12/2012  Wilkinson
2019/0101497 A1*   4/2019  Yick ..................... G01N 25/00

FOREIGN PATENT DOCUMENTS

| FR | 3002119 A1 * | 8/2014 | ............ A43D 1/025 |
| KR | 100955038 B1 | 4/2010 | |
| RU | 2686201 C1 * | 4/2019 | ............... A43D 1/06 |
| WO | WO-2017045102 A1 * | 3/2017 | |
| WO | WO-2018151620 A1 * | 8/2018 | ............... A43D 1/06 |

* cited by examiner

SHOE FIT MEASURING DEVICE

CROSS-REFERENCE TO RELATED APPLICATION

This Patent Application claims the benefit of U.S. Provisional Patent Application No. 62/916,152, filed on Oct. 16, 2019, titled "Shoe Fit Measuring Device", by inventor Geoffrey Gray, the contents of which are expressly incorporated herein by this reference as though set forth in their entirety and to which priority is claimed.

FIELD OF USE

The present disclosure relates generally to devices, systems, and methods that measure the fit of a shoe. More specifically, the present disclosure relates to shoe fit measuring device that comprises a replica human foot with sensors on it to determine how a shoe is fitting on the device.

BACKGROUND

It is important for shoes to fit a user. Shoes that don't fit are unusable and must be returned. Before the present disclosure, there was not a uniform way to quantify the fit of all shoes and how they fit on a human foot during an activity. Generally, shoes from one manufacturer might be smaller or larger than a shoe of the same size from another manufacturer. Shoe fit devices before the present disclosure generally consisted of a replica foot, with no sensors. The replica foot would then then have a newly manufactured shoe put on it to see if the shoe anecdotally fit. Currently, sensor enabled footwear testing devices are generally limited to traction testers, thus, what is needed is a shoe foot measuring device that determines accurately and expeditiously the fit of a shoe.

SUMMARY OF ILLUSTRATIVE EMBODIMENTS

To minimize the limitations in the cited references, and to minimize other limitations that will become apparent upon reading and understanding the illustrative embodiments, the present disclosure teaches a new and useful shoe fit measuring device.

In one embodiment the device of the present disclosure provides quantifying shoe fit without using an actual human foot. This device may be a replica human shaped foot outfitted with pressure sensors at key boney landmarks on the foot and distance gauges to measure empty spaces between the foot and the shoe. All data collected from the sensors and gauges may be calibrated in the device.

The device of the present disclosure may use low cost sensors integrated into a compact replica foot housing that is light weight and may be operated by any individual with minimal or no training. The electrical components of the device may be battery powered or plugged in to a power outlet. The device may also have the capability of being used on the production line due to these features, while current fit testing machines must be used in a separate lab.

The pressure sensors used may be slightly elevated from the surface of the foot replica and have a wire that continues to the internal cavity of the foot. The wire may provide electrical current and may deliver an electrical information to a transmitter. In one embodiment, the electrical current comes from an enclosed battery. The transmitter may receive the data from one, a portion of, or all of the sensors and convert the data to a pressure reading using the calibration data from the sensors. These pressure readings may be output to an integrated display that identifies each sensor and the specific pressure output of each sensor. The integrated display will indicate if the pressures are within an appropriate range or if they are too high or too low for a proper fitting shoe. These pressure outputs can be saved and stored internally on the device or exported wirelessly via Wifi® or Bluetooth® to an external storage device. Distance gauge measurements may function similarly to the pressure sensors in that they might be placed on the surface of the foot, have internally routed wires with supply power and deliver an electrical signal to the transmitter. The distance data may be displayed on the internal display and be available for export.

A multitude of pressure or force sensors can be utilized in the construction of the device. An exact replica of a human shaped foot is not required. Instead a foot bone skeleton, exoskeleton of the foot shape, or a new unique shape may be used. The surface of the foot shape may be hard (plastic, metal) or soft (rubber), for example.

The device may measure how a shoe fits on a variety of human feet. The device may do this by using sensors to measure how much pressure the shoe puts on the foot in various locations and how much space between the foot and the shoe exist in other locations.

The parts of the device may include, but are not limited to:

Human foot shaped portion: this portion (a) provides anchor point to the sensors so that they may be kept substantially in place, (b) encloses more delicate parts of the device, and (c) contacts, fills, and pushes against the interior portions of the shoe being fit tested in a manner similar to a human foot. This portion is placed into a shoe to get a plurality of shoe fit measurements. This portion may be expandable to replicate toe flex or a wider/narrower foot. Although described as a human foot shaped portion, and, preferably, the overall shape is generally shaped like a human foot, this portion does not have to be completely anatomically correct.

Pressure sensors: pressure or force sensors that record the pressure once the foot shape is placed in the shoe.

Distance gauges: such as laser or optical distance measurement sensors that may measure and calculate the space between the foot portion and the shoe.

Transmitter/Transceiver/Electronic Data Processing Unit: converts the raw sensor and gauge signals to a calibrated pressure value, distance, or score for the shoe. This transmitter may also store the pressure data from a "control" shoe and compare future shoes to that control.

Power supply: provides power to the sensors, gauges, and transmitter.

Display: preferably digital that may show pressure and distance readings, fit calculations and scores, and comparison of current data to established standards.

Additional features of some embodiments of the present disclosure may include the use of pressure and distance gauges, calibrated pressure sensors, an adjustable foot form, and having a transmitter/display that compares readings to a previously tested shoe. Another feature may be the use of pressure and distance gauges, calibrated pressure sensors, adjustable foot form, and having a transmitter/display that compares readings to a previously tested shoe. In some embodiments, factories may use the device to test the fit of shoes directly on the production floor.

The device may also be used by footwear manufacturers and distributors to test shoes at their offices. Retailers may use the device to measure the fit of the shoes they intend to sell. Generally, there would need to be a device for each shoe size made.

One embodiment may be a shoe fit measuring device, comprising: a replica human foot portion; and one or more sensors; wherein the one or more sensors are configured to determine whether a plurality of shoes being fit tested are made to size; wherein the replica human foot portion is configured to be inserted into the plurality of shoes being fit tested; wherein the one or more sensors are operatively engaged with the replica human foot portion, such that when the replica human foot portion is inserted into the plurality of shoes being fit tested one or more fit measurements are taken. The one or more sensors may comprise one or more pressure sensors and one or more distance gauges; wherein the one or more distance gauges may be configured to measure one or more open spaces between the replica human foot portion and the plurality of shoes being fit tested when the replica human foot portion is inserted into the plurality of shoes being fit tested, such that one or more distance measurements are taken; wherein the one or more pressure sensors take one or more pressure measurements. The device may further comprise a display, wherein the display is in communication with the one or more pressure sensors and the one or more distance gauges, and is configured to display the one or more pressure measurements and the one or more distance measurements. There may be three distance gauges: a heel distance gauge; a toe length distance gauge; and a toe depth distance gauge. There may be eight pressure sensors: a pinky toe pressure sensor; a lateral ball pressure sensor; a fifth metatarsal pressure sensor; a lateral heel pressure sensor; a medial heel pressure sensor; a navicular pressure sensor, a medial ball pressure sensor; and a big toe pressure sensor. The one or more pressure measurements may be displayed on the display as pass/fail for each of the one or more pressure measurements. The one or more pressure measurements may be displayed on the display on a graphic representation of a human foot. The replica human foot portion may have an increased lateral shape and size over an ideal foot size. The increased lateral shape and size may be increased at a pinky toe portion, at a lateral ball portion, at a fifth metatarsal portion, and at a medial ball portion. The pinky toe portion lateral increase may be in the range of 1 to 6 millimeters. The lateral ball portion lateral increase may be in the range of 1 to 8 millimeters. The fifth metatarsal portion lateral increase may be in the range of 1 to 6 millimeters. The medial ball portion lateral increase may be in the range of 1 to 8 millimeters. The pinky toe portion lateral increase may be 5 millimeters. The lateral ball portion lateral increase may be 5 millimeters. The fifth metatarsal portion lateral increase may be 4 millimeters. The medial ball portion lateral increase may be 3 millimeters. The replica human foot portion may have a handle.

Another embodiment may be a shoe fit measuring device, comprising: a replica human foot portion; one or more pressure sensors; one or more distance gauges; an electronic data processing unit; and a display; wherein the one or more pressure sensors and the one or more distance gauges are configured to determine whether a plurality of shoes being fit tested are made to size; wherein the replica human foot portion is configured to be inserted into the plurality of shoes being fit tested; wherein the one or more pressure sensors are operatively engaged with the replica human foot portion, such that when the replica human foot portion is inserted into the plurality of shoes being fit tested one or more pressure measurements are taken; wherein the one or more distance gauges are operatively engaged with the replica human foot portion; wherein the one or more distance gauges are configured to measure one or more open spaces between the replica human foot portion and the plurality of shoes being fit tested when the replica human foot portion is inserted into the plurality of shoes being fit tested, such that one or more distance measurements are taken; wherein the display is in communication with the one or more pressure sensors and the one or more distance gauges and is configured to display the one or more pressure measurements and the one or more distance measurements; and wherein the one or more pressure measurements and the one or more distance measurements are stored on a memory of the electronic data processing unit. The one or distance gauges may be three distance gauges: a heel distance gauge; a toe length distance gauge; and a toe depth distance gauge. The one or more pressure sensors may be eight pressure sensors: a pinky toe pressure sensor; a lateral ball pressure sensor; a fifth metatarsal pressure sensor; a lateral heel pressure sensor; a medial heel pressure sensor; a navicular pressure sensor, a medial ball pressure sensor; and a big toe pressure sensor. The one or more pressure measurements may be displayed on the display as pass/fail on a graphic representation of a human foot for each of the one or more pressure measurements. The replica human foot portion may have an increased lateral shape and size over an ideal foot size. The increased lateral shape and size may be increased at a pinky toe portion, at a lateral ball portion, at a fifth metatarsal portion, and at a medial ball portion. The pinky toe portion lateral increase may be in the range of 1 to 6 millimeters, preferably 5. The lateral ball portion lateral increase may be in the range of 1 to 8 millimeters, preferably 5. The fifth metatarsal portion lateral increase may be in the range of 1 to 6 millimeters, preferably 4. The medial ball portion lateral increase may be in the range of 1 to 8 millimeters, preferably 3.

Another embodiment may be a shoe fit measuring device, comprising: a replica human foot portion; one or more pressure sensors; and one or more distance gauges; wherein the one or more pressure sensors and the one or more distance gauges are configured to determine whether a plurality of shoes being fit tested are made to size; wherein the replica human foot portion is configured to be inserted into the plurality of shoes being fit tested; wherein the one or more pressure sensors are operatively engaged with the replica human foot portion, such that when the replica human foot portion is inserted into the plurality of shoes being fit tested one or more pressure measurements are taken; wherein the one or more distance gauges are operatively engaged with the replica human foot portion; wherein the one or more distance gauges are configured to measure one or more open spaces between the replica human foot portion and the plurality of shoes being fit tested when the replica human foot portion is inserted into the plurality of shoes being fit tested, such that one or more distance measurements are taken; wherein the replica human foot portion has an increased lateral shape and size over an ideal foot size at a pinky toe portion, at a lateral ball portion, at a fifth metatarsal portion, and at a medial ball portion; wherein the pinky toe portion lateral increase is 5 millimeters; wherein the lateral ball portion lateral increase is 5 millimeters; wherein the fifth metatarsal portion lateral increase is 4 millimeters; and wherein the medial ball portion lateral increase is 3 millimeters.

Other features and advantages are inherent in the replica human foot shoe fit testing device claimed and disclosed will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE DRAWINGS

In the following detailed description of various embodiments of the present disclosure, numerous specific details are set forth in order to provide a thorough understanding of various aspects of one or more embodiments of the present disclosure. However, one or more embodiments of the present disclosure may be practiced without some or all of these specific details. In other instances, well-known methods, procedures, and/or components have not been described in detail so as not to unnecessarily obscure aspects of embodiments of the present disclosure.

While multiple embodiments are disclosed, still other embodiments of the present disclosure will become apparent to those skilled in the art from the following detailed description, which shows and describes illustrative embodiments of the present disclosure. As will be realized, the device of the present disclosure is capable of modifications in various obvious aspects, all without departing from the spirit and scope of the present disclosure. Accordingly, the screen shot figures, and the detailed descriptions thereof, are to be regarded as illustrative in nature and not restrictive.

Also, the reference or non-reference to a particular embodiment of the present disclosure shall not be interpreted to limit the scope of the present disclosure.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 15% of the indicated number or range of numbers. In one embodiment, the term "approximately" and "about", refer to a deviance of between 0.0001-40% from the indicated number or range of numbers.

Figure 1:
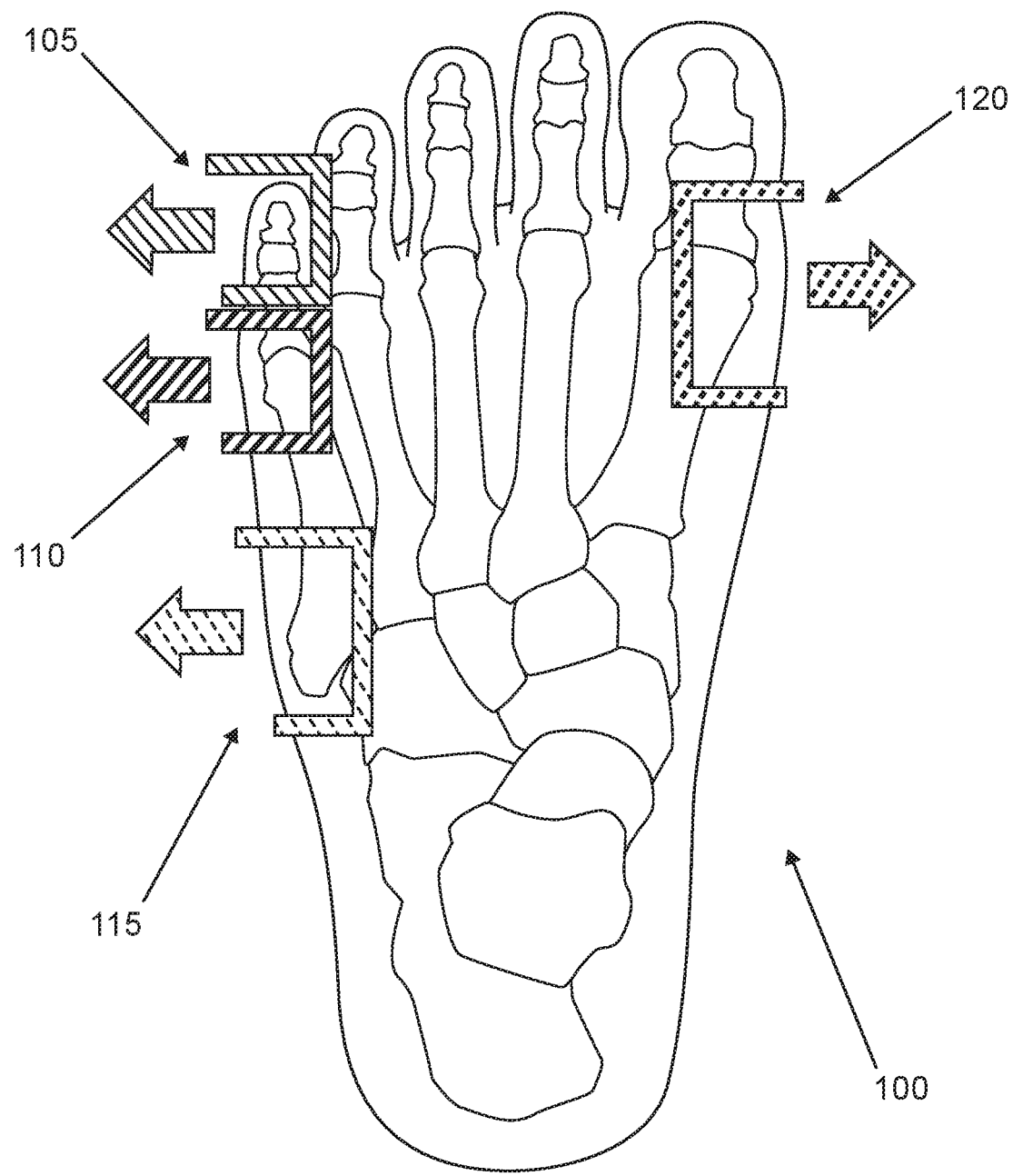
FIG. 1 is an illustration of a human foot showing the testing pressure points.

FIG. 1 is an illustration of a human foot showing pressure point areas of the foot that may change as the user performs an activity. There is a significant difference in how a shoe fits when the wearer is idle or standing still ("static fit") as opposed to when the wearer is performing an activity ("dynamic fit"). Pressures inside of a shoe may increase 39-99% when comparing dynamic fit to static fit. Applying sensors to a synthetic foot that is identical in shape and dimension to an average foot will only provide static fit data, which has minimal value in understanding the true "fit" of the shoe to the consumer. An effective shoe fit assessment system must measure, calculate, or estimate the dynamic fit of a shoe. The device of the present disclosure may use a modified foot shape derived from each "Average" foot size, with the following modifications:

| Foot Area | Ideal Change From Average Foot Shape/Size | Lowest Change | Highest Change |
| --- | --- | --- | --- |
| Pinky Toe 105 | 5 mm laterally | 1 mm laterally | 6 mm laterally |
| Lateral Ball of Foot 110 | 5 mm laterally | 1 mm laterally | 8 mm laterally |
| Lateral Foot 115 | 4 mm laterally | 1 mm laterally | 6 mm laterally |
| Medial Ball of Foot 120 | 3 mm medially | 1 mm medially | 8 mm medially |

As shown in FIG. 1, the device of the present disclosure may be a replica human foot 100 that has an increased lateral shape and size over an average foot. Preferably, the pinky toe portion 105 is increased laterally by 5 mm. Preferably, the lateral ball of the foot portion 110 is increased by 5 mm. Preferably, the lateral ball of the foot portion 110 is increased by 5 mm. Preferably, the lateral foot portion 115 is increased by 4 mm. Preferably, the medial ball of the foot portion 120 is increased by 3 mm. These modifications were developed by comparing sensor data from human testers performing activities in a variety of shoes. A replica foot was created, and material was added or removed at the pressure points 105, 110, 115, 120. until pressure sensors attached to the replica foot produced the identical data found on the human testing. In various embodiments, the final foot shape may be entirely rigid or collapsible to facilitate moving the system in to and out of the replica test footwear of the present disclosure. The data from the replica foot sensors using the shape modifications is less than one (1) pound per square inch (psi) from what the human testers produce during dynamic activities.

Figure 2:
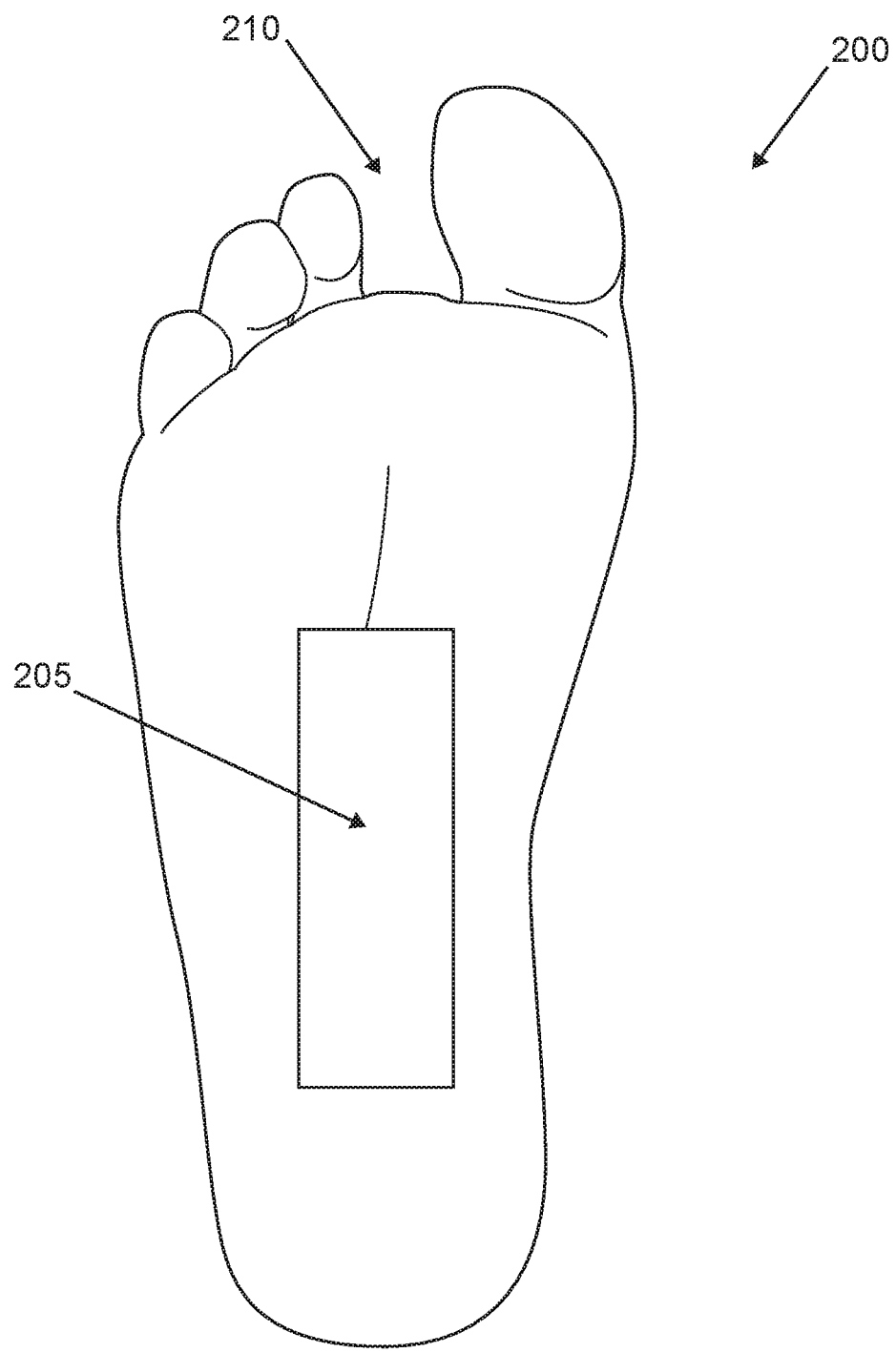
FIG. 2 is an illustration of a bottom view of one embodiment of a replica human foot shoe fit measuring device.

FIG. 2 is an illustration of a bottom view of one embodiment of a replica human foot shoe fit measuring device. Preferably, the replica human foot shoe measuring device 200 may be made from a material that is durable, such as high-grade plastic, wood, or metal, such that it may withstand thousands of insertions and removals from shoes. The replica human foot shoe measuring device 200 may be hollow, cored, or channeled so that the wiring to all sensors may be held securely within the outer silhouette of the replica human foot shoe measuring device 200. Preferably, the wires may exit the top of the replica human foot shoe measuring device 200 near the ankle or handle of the device 200. FIG. 2 shows one embodiment of the replica human foot shoe measuring device 200 with cavities or channels on the underside 205 and toe area 210. FIG. 2 also shows that the replica human foot shoe measuring device 200 may be made from a plastic material.

In one embodiment, the replica human foot shoe measuring device 200 may have a handle on the top side that assists the user or device that inserts and removes the device 200 into and out of the shoes being fit tested. Preferably, the handle may be angled posteriorly (towards the heel) so that it provides the user with sufficient leverage and is able to get in and out of shoes that may have a tall shaft, such as cowboy boots. The handle may extend six to twelve inches beyond the top of the main body of the replica human foot shoe measuring device 200 and may be angled in the range of 30 to 90 degrees with respect to the flat bottom of the device 200.

Figure 3:
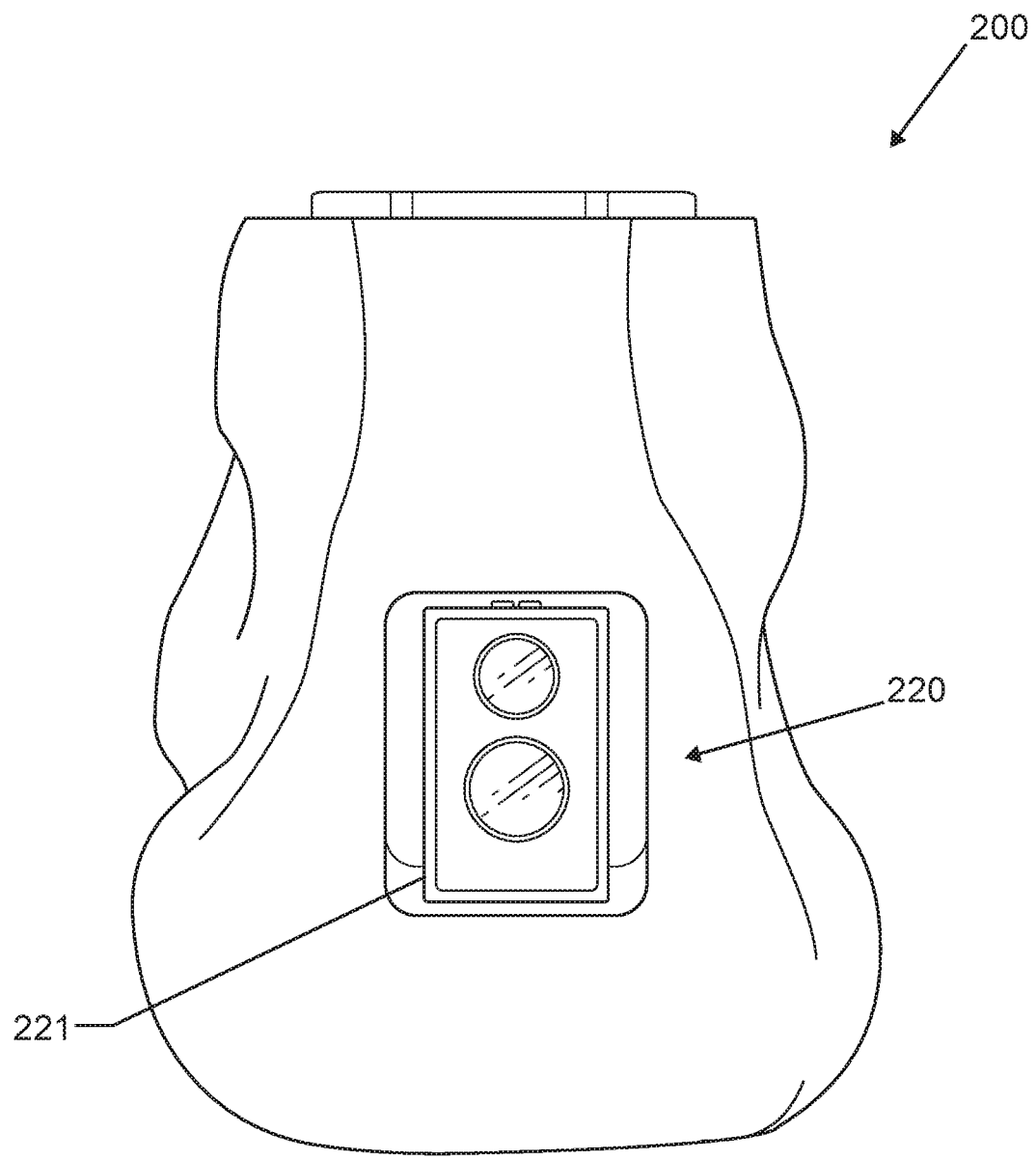
FIG. 3 is an illustration of a heel view of one embodiment of a replica human foot shoe fit measuring device and shows the placement of a heel distance gauge.

FIG. 3 is an illustration of a heel view of one embodiment of a replica human foot shoe fit measuring device and shows the placement of a heel distance gauge. Preferably, the replica human foot shoe measuring device 200 may have notches that allow for the placement of distance gauges, such as heel distance gauge notch 220. The distance gauges may measure the empty space between the replica human foot shoe measuring device 200 and the inside of the shoe being tested. Additionally, these gauges help align the replica human foot shoe measuring device 200 with the shoe. As shown in FIG. 3, the heel notch 220 allows the heel distance gauge 221 to be recessed into the back of the heel of the replica human foot shoe measuring device 200. The distance gauges may be used to identify distance from the back of the heel to the inside back portion of the shoe. The distance measurements ensure that the shoe is lined up correctly inside of the shoe before the other sensors start taking and recording measurements. Proper placement of the device within the shoe being tested is very important to maintain consistency and repeatability between tests.

Figure 4:
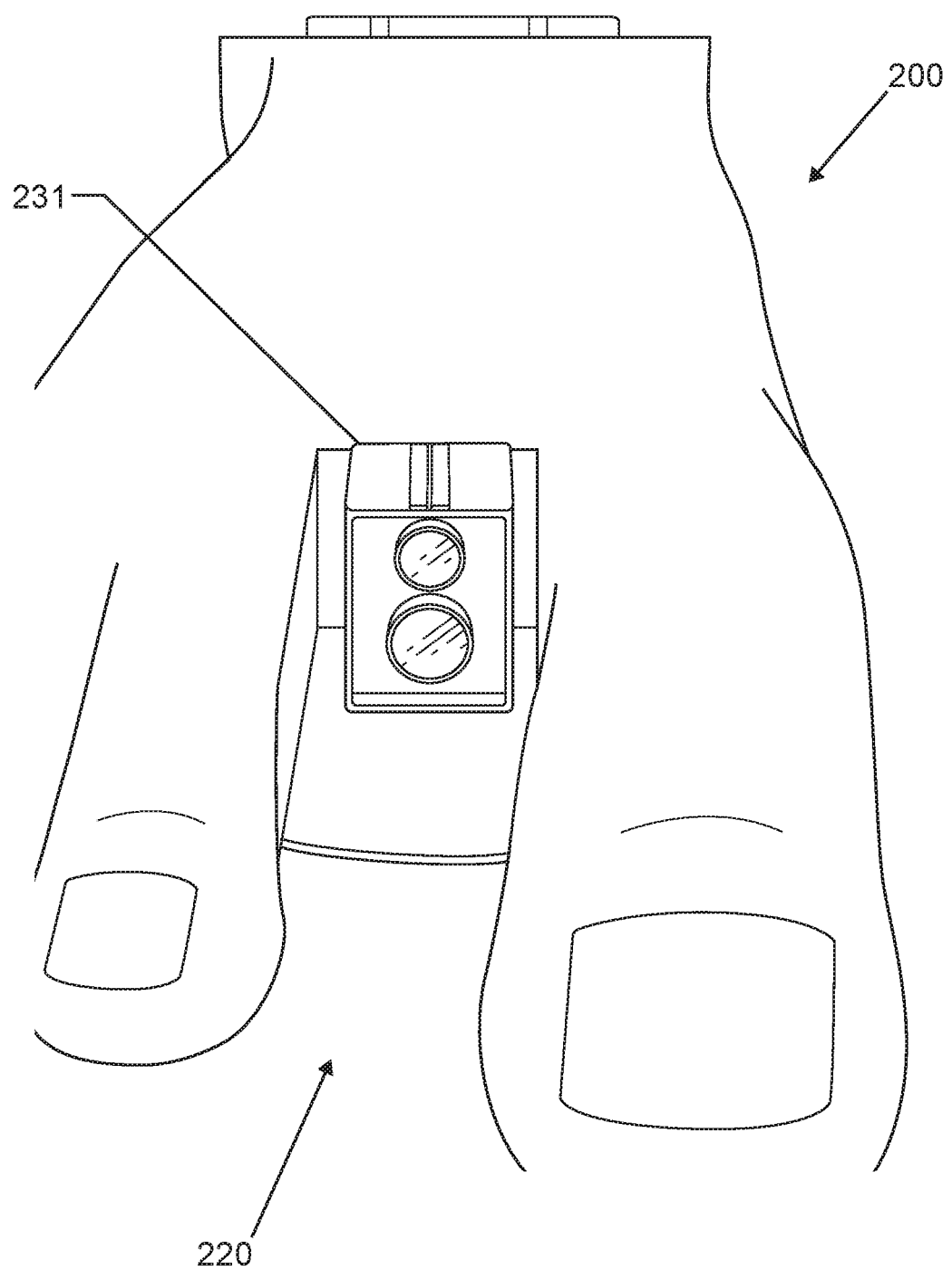
FIG. 4 is an illustration of a toe view of one embodiment of a replica human foot shoe fit measuring device and shows the placement of a toe length distance gauge.

FIG. 4 is an illustration of a toe view of one embodiment of a replica human foot shoe fit measuring device and shows the placement of a toe length distance gauge. As shown in FIG. 4, the replica human foot shoe measuring device 200 may have a toe notch 220 that allows toe length distance gauge 231 to be recessed into the front of the replica human foot shoe measuring device 200, approximately aligned with the second metatarsophalangeal (MTP) joint, which is the second toe at the ball of the replica human foot shoe measuring device 200. Preferably, the toe length distance gauge 231 may be substantially perpendicular to the bottom of the replica human foot shoe measuring device 200 and it measure and records the distance from the tip of the toes of the replica human foot shoe measuring device 200 to the inside front end of the shoe being fit measured.

Figure 5:
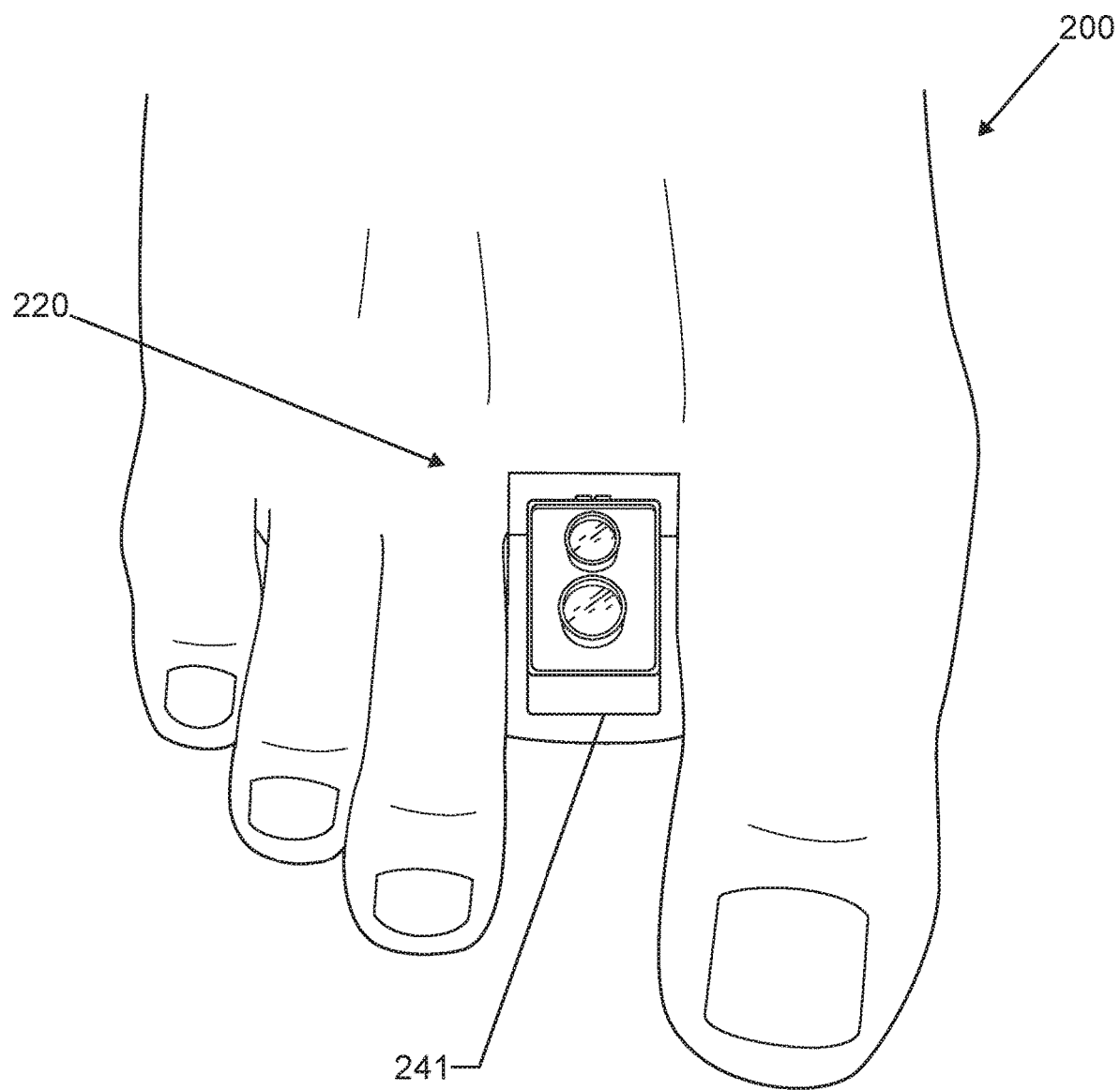
FIG. 5 is an illustration of a toe view of one embodiment of a replica human foot shoe fit measuring device and shows the placement of a toe depth distance gauge.

FIG. 5 is an illustration of a toe view of one embodiment of a replica human foot shoe fit measuring device and shows the placement of a toe depth distance gauge. As shown in FIG. 5 the toe notch 220 may also allow toe depth distance gauge 241 to be recessed into the front of the replica human foot shoe measuring device 200. The toe depth distance gauge 241 is preferably parallel to, and looking up from, the bottom of the device 200. The toe depth distance gauge 241 is preferably between the third and first toe of the device 200. The toe depth distance gauge 241 may measure and record the amount of space above the toes in the shoe being tested.

The distance gauges 221, 231, 241 may be laser distance sensors that measure distances, object lengths, and/or provide positional locations. The distance gauges 221, 231, 241 are preferably accurate up to 0.1 millimeters and may have an output rate of several thousand readings per second.

To achieve an accurate distance measurement, the distance gauges 221, 231, 241 may record a distance value that represents the total distance from the sensor to the inside portion of the shoe being tested. The offset from the end surface of the device 200 to the distance gauges 221, 231, 241 is fixed and the device 200 may subtract this known distance from the measured distance to display an accurate empty space distance between the device 200 and the shoe being fit tested.

In addition to the one or more distance gauges, pressure sensors may also be attached to the replica human foot shoe measuring device 200. In one embodiment, one or more pressure sensors may be attached to or integrated with the surface of the replica human foot shoe measuring device 200 and then covered with a thin, flexible, and durable material that may not impede the sensors ability to measure and record data. In this embodiment, the sensors may be mounted on a small cylinder projection that may preferably be the same diameter as the recording area of the sensor. The cylinder projection end may have a slight convexity, which may allow the pressure sensors to record data similar to how they would record if attached to a human foot. Preferably, the convexity change from the edge of the cylinder projection to the center is less than one (1) millimeter (mm). The cylinder projections may or may not have a small channel or "moat" around the edge to ensure the surrounding foot surface is not contacting the pressure sensor.

In another embodiment, the sensors may be attached to the cylinder projections by an adhesive instead of a film covering.

In a third embodiment, the sensors may be placed on the inside of the device 200 at the receiving end of a small piston that actuates and presses on the pressure sensor when pressure is applied by the shoe being tested. This embodiment is shown in FIG. 6.

Figure 6:
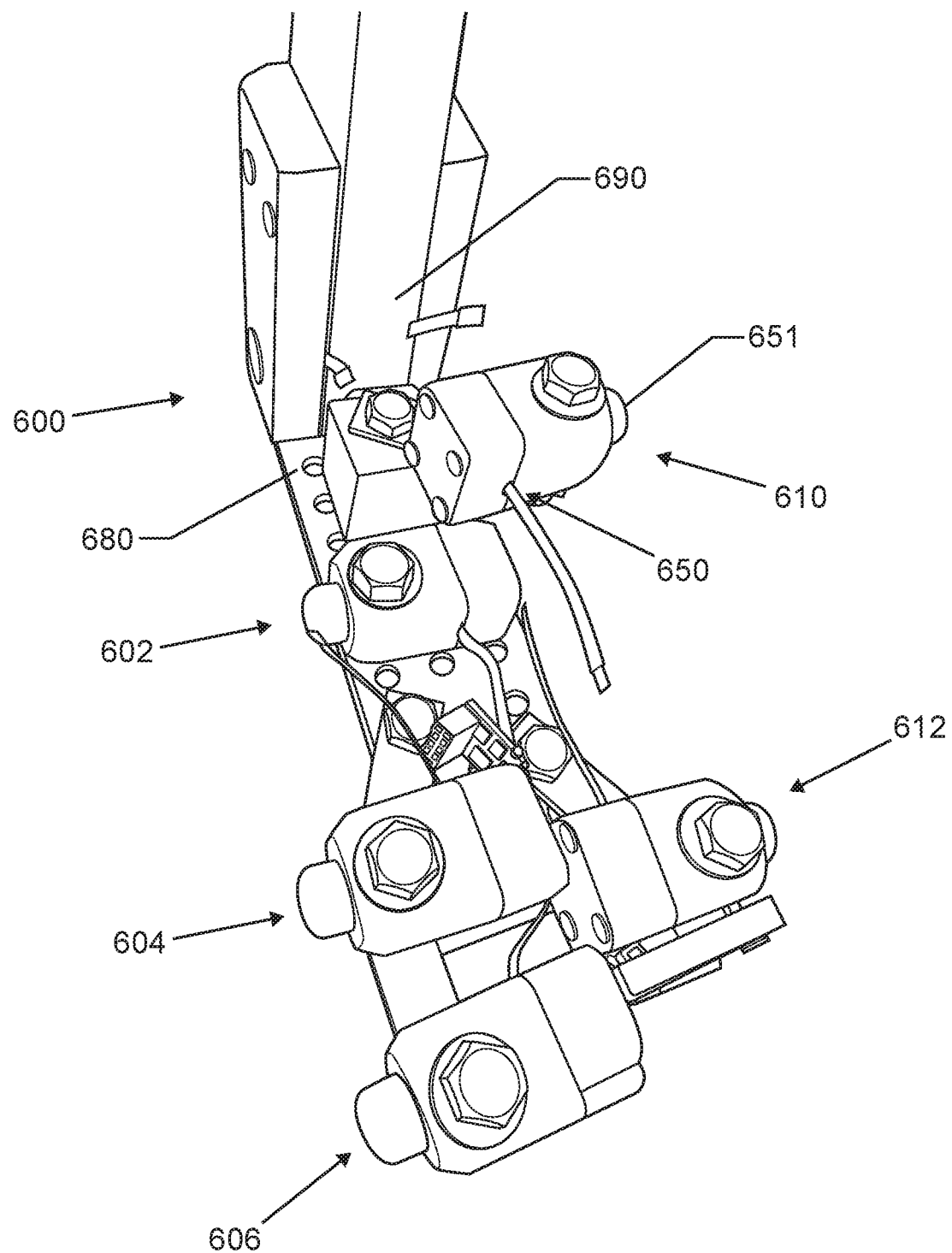
FIG. 6 is an illustration of one embodiment of a replica human foot shoe fit measuring device and shows the pressure sensors not on the surface of the device.

FIG. 6 is an illustration of one embodiment of a replica human foot shoe fit measuring device and shows the pressure sensors not on the surface of the device. As shown in FIG. 6, the replica human foot shoe fit measuring device 600 may have an ankle/handle portion 690 that is attached to replica foot portion 680, which has a plurality of pressure sensors 602, 604, 606, 610, 612. Each pressure sensor may have a piston 651 that, when pressed inward by contact with shoe being tested, may engage an interior pressure sensor 650.

Figure 7:
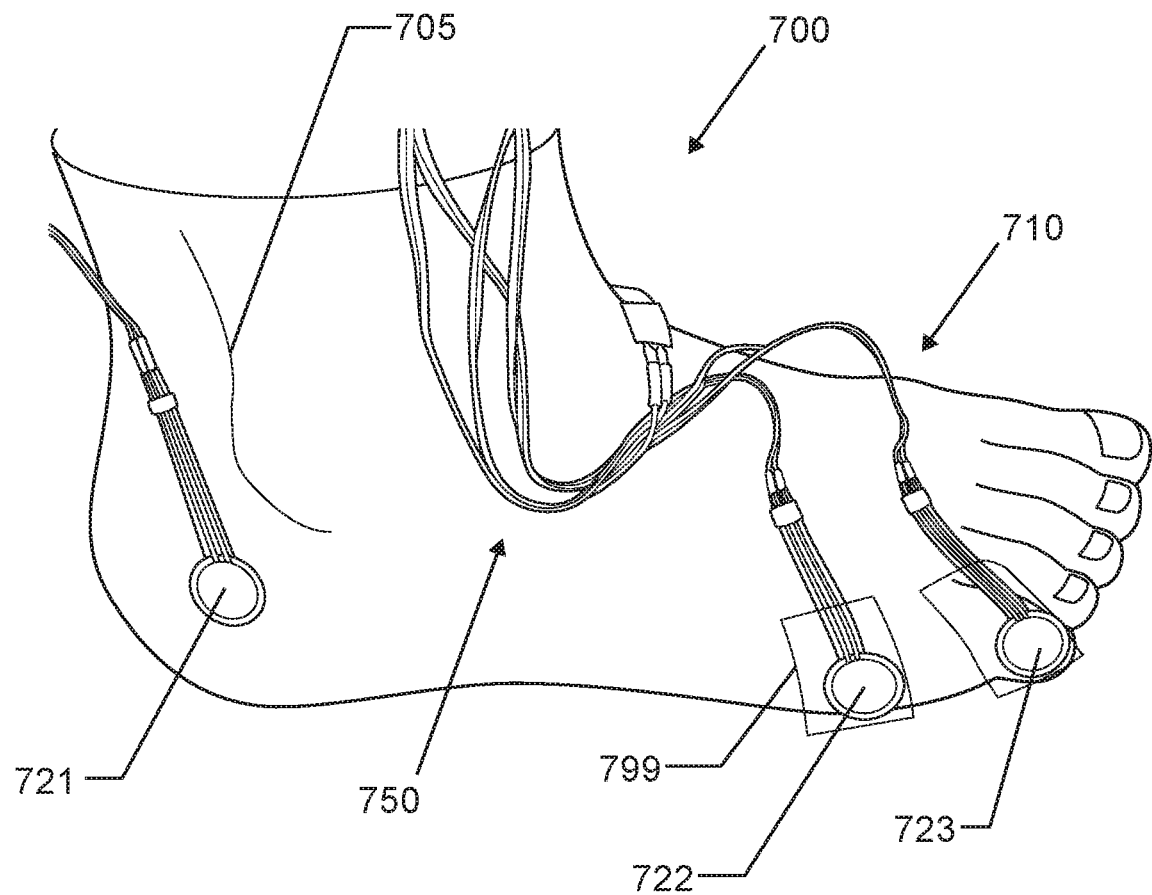
FIG. 7 is an illustration of one embodiment of a replica human foot shoe fit measuring device that shows the sensors attached to an outer surface.

FIG. 7 is an illustration of one embodiment of a replica human foot shoe fit measuring device that shows the sensors attached to an outer surface. As shown in FIG. 7, the replica human foot shoe fit measuring device 700 may be a replica of a human foot with a plurality of pressure sensors 721, 722, 723 attached to the surface of foot portion 710. The wires 750 from the sensors 721, 722, 723 to the electronic data processing unit may run up the ankle/handle portion 705 via a channel, hole, or along the surface, as shown. Sensor 722 is shown being held in place on the surface of device 700 via a film 799. Sensor 721 is shown as attached to the foot portion 710 via an adhesive.

Figure 8:
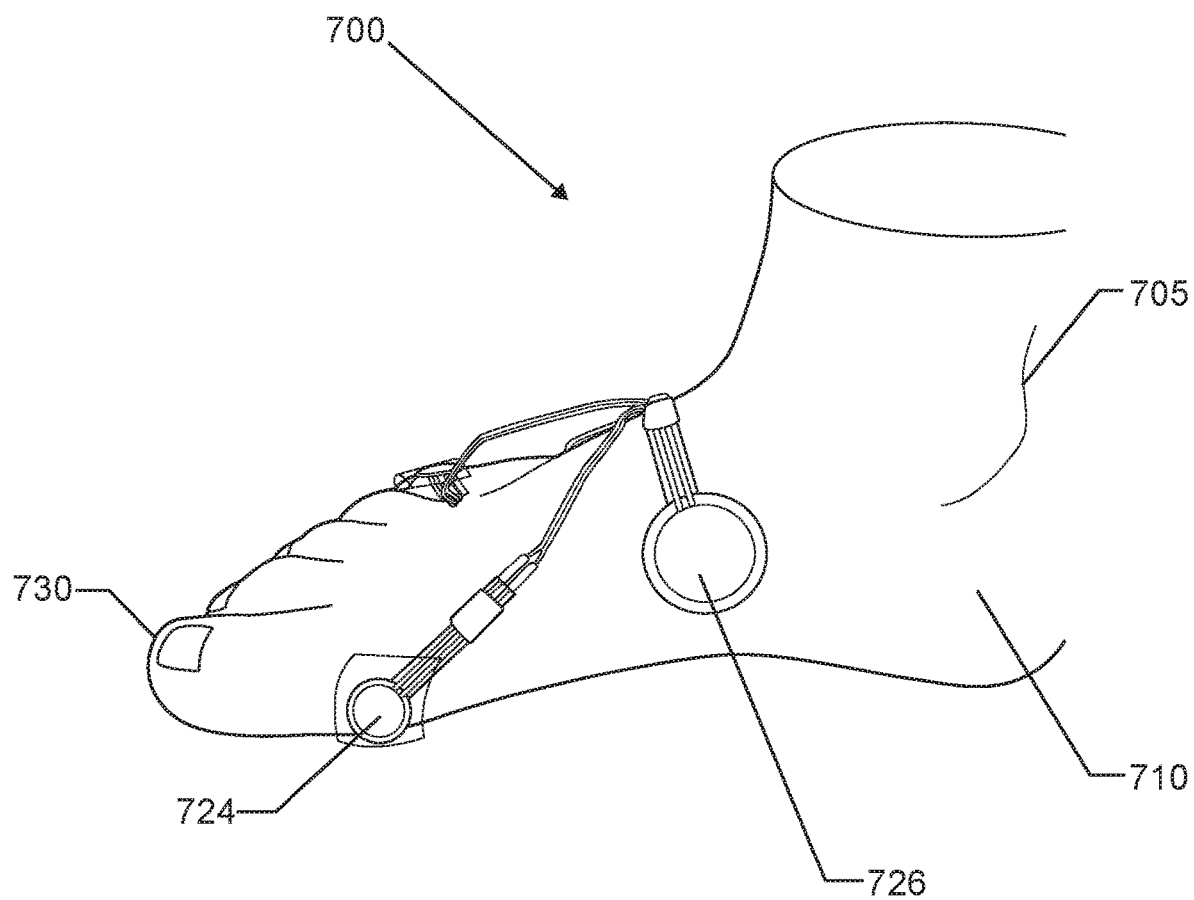
FIG. 8 is an illustration of one embodiment of a replica human foot shoe fit measuring device that shows the sensors attached to an outer surface.

FIG. 8 is an illustration of one embodiment of a replica human foot shoe fit measuring device that shows the sensors attached to an outer surface. As shown in FIG. 8 the replica human foot shoe fit measuring device 700 may have a handle ankle portion 705 and a foot portion 710, which may have one or more pressure sensors 724, 726, and a distance gauge 730. In other embodiments, sensor 730 may be a pressure sensor.

Figure 9:
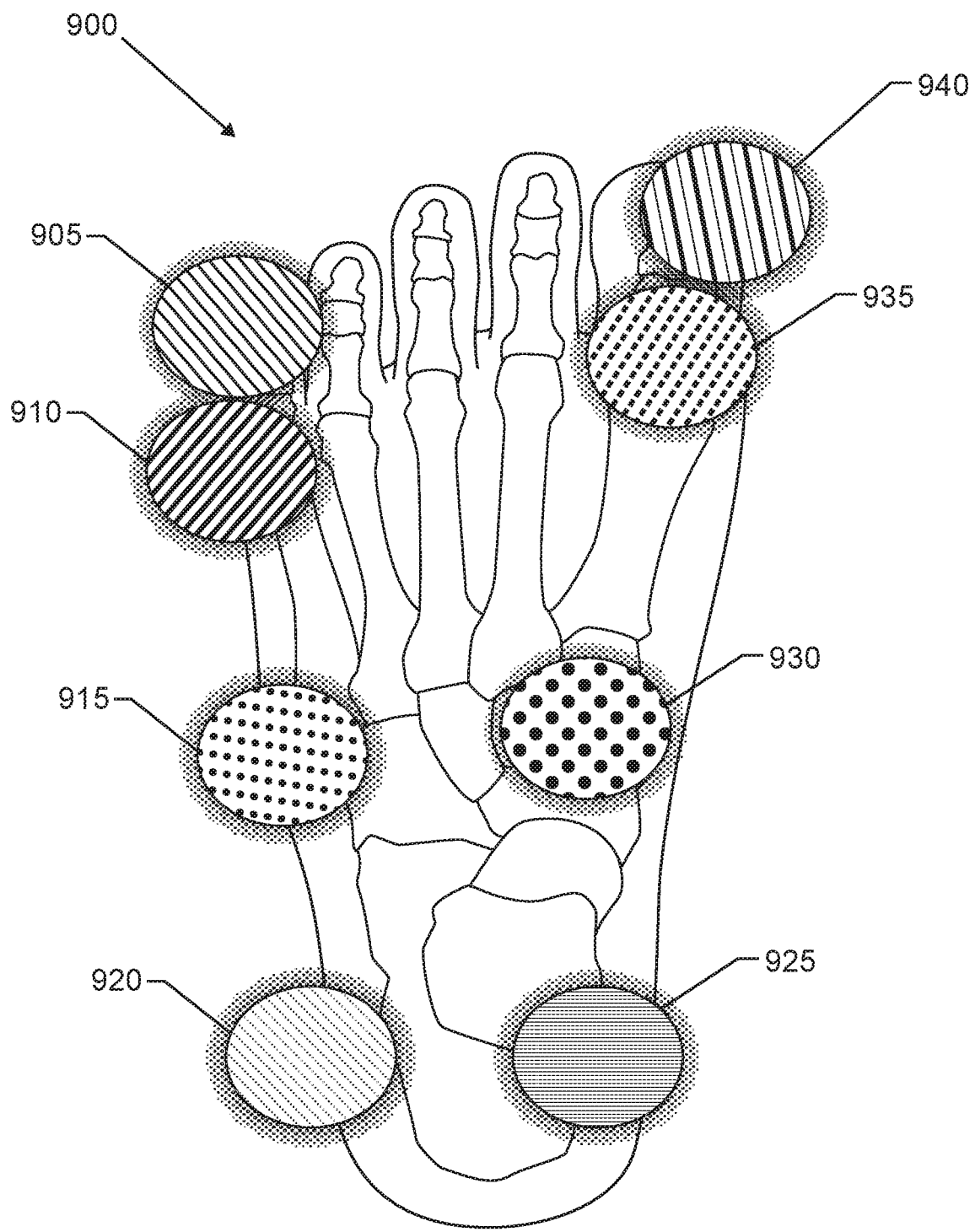
FIG. 9 is an illustration of a silhouetted skeletal foot that shows the approximate locations of pressure sensors on the replica human foot shoe fit measuring device of the present disclosure.

FIG. 9 is an illustration of a silhouetted skeletal foot that shows the approximate locations of pressure sensors on the replica human foot shoe fit measuring device of the present disclosure. As shown in FIG. 9, one or more pressure sensors are preferably placed on the foot 900 at pinky toe 905, lateral ball 910, fifth metatarsal 915, lateral heel 920, medial heel 925, navicular 930, medial ball 935, big toe 940.

Generally, pressure sensors must be calibrated to produce accurate data. The preferred way to calibrate the sensors is the input of a target range for each sensor that represents an "ideal" fit based on fit scores on human testers. In this manner if a shoe produces a pressure within this range it may be score as "good" and/or "acceptable". If the pressure is higher than the ideal range that location may be given a score of "tight" and/or "unacceptable". If the pressure is lower than the ideal range the location may be given a score of "loose" and/or "unacceptable". The calibration data may be stored in the memory of the electronic data processing unit of the device.

In another embodiment, the sensors may undergo custom calibration. The user places the replica human foot shoe fit measuring device inside of a test shoe that represents ideal fit for that particular shoe size. The replica human foot shoe fit measuring device may identify the pressure and distance measurements/readings for each sensor and then create an ideal range of pressures and distances above and below the measured ideal. This ideal range may be set and now represent the target for "good" fit. The range used may be based on a percent change from the recorded pressures in the test. Any pressures below that range will be "loose" and any pressures above that range are "tight". The equations for setting the pressure range may be stored in the processor/computing unit so that the user will not need to manually calculate the pressure ranges. This custom calibration may be used until the user recalibrates in the preferred way or chooses a new custom calibration with a new shoe.

The replica human foot shoe fit measuring device of the present disclosure may produce two types of data: (a) immediate measurements and (b) analyzed data. The immediate measurements may be displayed immediately on the display during the testing. In one embodiment, the data may be color coded, such as showing green for a "good" fit. In the event that all of the sensors are a good fit, then the word "PASS" may be displayed on the screen. If the sensor measurement is above the ideal a second color, such as red, may be used to inform the user of a "tight" fit. If any sensor measurement is too low a third color, such as blue, may be displayed that indicates the fit is "loose". If any pressure sensor displays a tight or loose color the word "FAIL" will be shown on the display. This PASS/FAIL system provides the user instant feedback on the performance of the shoe being tested.

Figure 10:
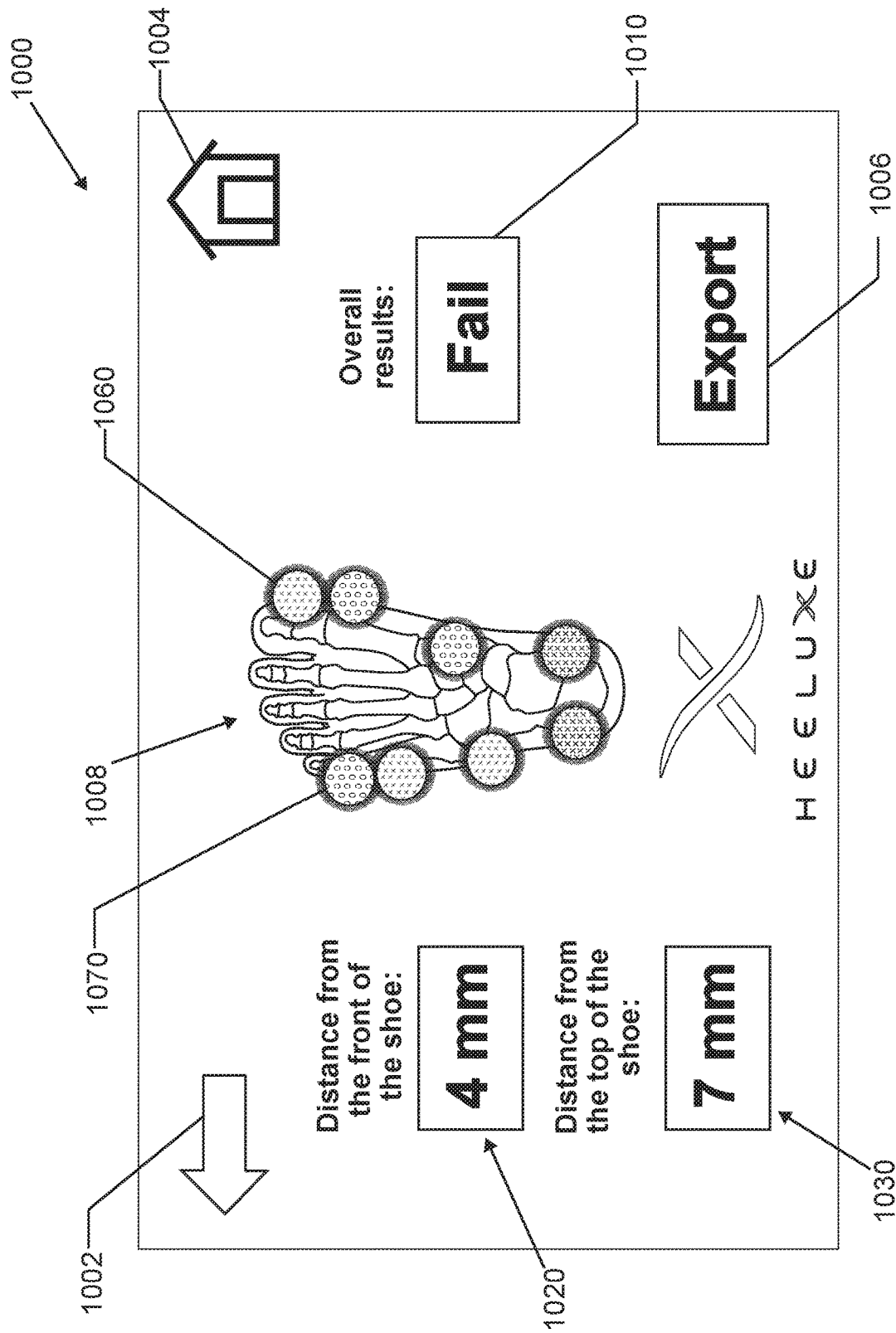
FIG. 10 is an illustration of one embodiment of a results/measurements display.

FIG. 10 is an illustration of one embodiment of a results/measurements display. As shown in FIG. 10 shows that the display 1000 may comprise a back button 1002, home button 1004, export button/selection 1006, foot pressure sensor results display 1008, overall results 1010, distance from the front of the shoe 1020, and distance from the top of the shoe 1030. The user may choose to export the measured data for record keeping or additional analysis via the "EXPORT" button/selection 1006, which may sends this data to a local storage device, such as a SD card, or transmits the data to a computing device via a hard wire connection, email, message, Wifi®, Bluetooth®, or some other type of connection. The exported data may be in .csv format and may include the name of the shoe being tested, date and time the shoe was tested, the pressure values recorded at each pressure sensor, and the distance gauge measurements. The export button 1006 may also be used to stop the data collection. The foot pressure sensor results display 1008 shows that each of the pressure sensors receives a pass 1060, shown in green, or a fail 1070, shown in red. The distance results 1020, 1030, which are provided from the distance gauges, may be outlined in pass green or fail red. Finally, the overall result 1010, which is typically a fail if any specific measurement fails, may be a fail/red or pass/green.

In one embodiment, the ideal pressure sensors for use in the device and system of the present disclosure may be capacitance or resistance based pressure sensors. Preferably, the sensors may be thin (less than a millimeter thick), flexible, durable, and accurate between approximately 0.5-30.0 pounds per square inch (psi). The diameter of the pressure sensors may vary based on the size of the foot but the diameter is preferably between approximately 0.3-1.5 centimeters (cm). Preferably, the sensors should be calibrated in order to produce a reliable pressure value during testing and use.

The electronic components of the device may include a microcontroller that is powered by a battery pack or another power source. The microcontroller may be connected to the one or more laser distance gauges and the several pressure sensors by electrical power and communication wires. The electrical components may also be connected to the display, which may be a touch screen.

Figure 11:
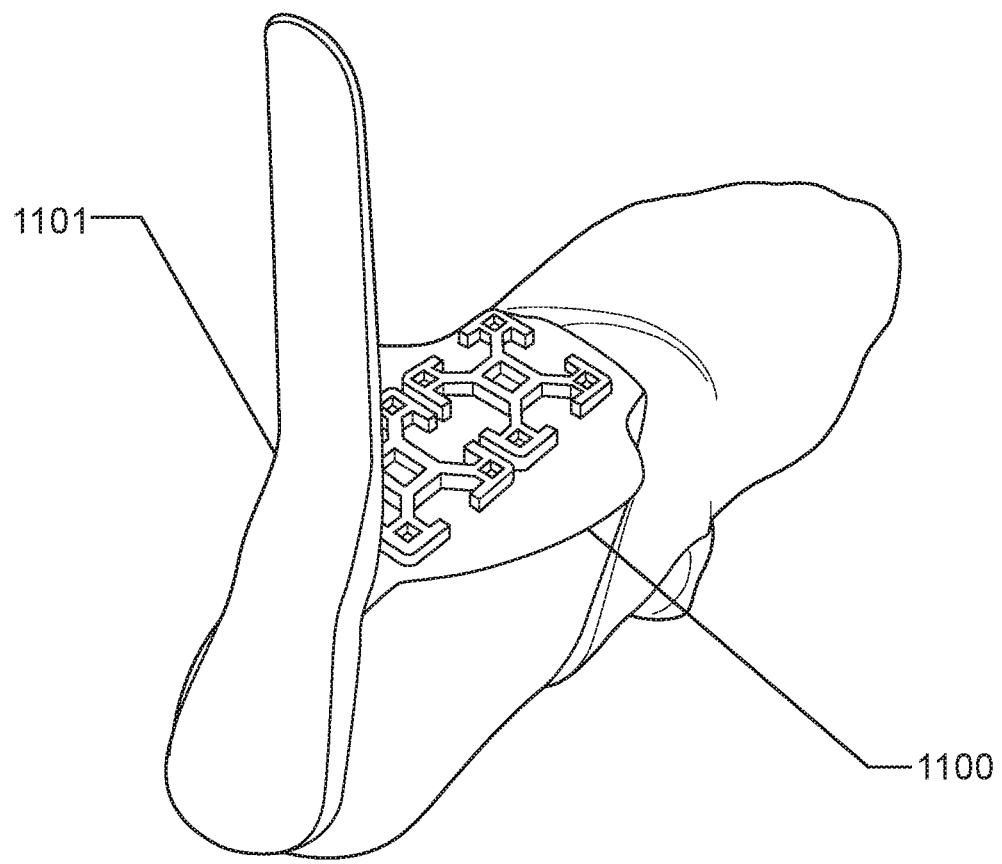
FIG. 11 is an illustration that shows the replica human foot shoe fit measuring device with a handle.

FIG. 11 is an illustration that shows the replica human foot shoe fit measuring device with a handle. FIG. 11 shows that the replica human foot shoe fit measuring device 1100 may comprise a handle 1101 that may be where the ankle would be. This handle 1101 may allow a user or a robot to manipulate the device into and out of a shoe to be tested.

The foregoing description of the specific embodiments will so fully reveal the general nature of the present disclosure that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the present disclosure have been described in terms of preferred embodiments, those skilled in the art will recognize that the embodiments of the present disclosure may be practiced with modification within the spirit and scope of the appended claims.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the embodiments has been presented for the purposes of illustration and description. While multiple embodiments are disclosed, still other embodiments will become apparent to those skilled in the art from the above detailed description. As will be realized, these embodiments are capable of modifications in various obvious aspects, all without departing from the spirit and scope of the protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that these embodiments not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A shoe fit measuring device, comprising:
a replica human foot portion; and
one or more sensors;
wherein said one or more sensors are configured to determine whether a plurality of shoes being fit tested are made to size;
wherein said replica human foot portion is configured to be inserted into said plurality of shoes being fit tested;
wherein said one or more sensors are operatively engaged with said replica human foot portion, such that when said replica human foot portion is inserted into said plurality of shoes being fit tested one or more fit measurements are taken;
wherein said one or more sensors comprise one or more pressure sensors and one or more distance gauges;
wherein said one or more distance gauges are configured to measure one or more open spaces between said replica human foot portion and said plurality of shoes being fit tested when said replica human foot portion is inserted into said plurality of shoes being fit tested, such that one or more distance measurements are taken;
wherein said one or more pressure sensors take one or more pressure measurements.

2. The device of claim 1, further comprising: a display;
wherein said display is in communication with said one or more pressure sensors and said one or more distance gauges, and is configured to display said one or more pressure measurements and said one or more distance measurements.

3. The device of claim 2, wherein said one or distance gauges are three distance gauges: a heel distance gauge; a toe length distance gauge; and a toe depth distance gauge.

4. The device of claim 2, wherein said one or more pressure sensors are eight pressure sensors: a pinky toe pressure sensor; a lateral ball pressure sensor; a fifth metatarsal pressure sensor; a lateral heel pressure sensor; a medial heel pressure sensor; a navicular pressure sensor, a medial ball pressure sensor; and a big toe pressure sensor.

5. The device of claim 2, wherein said one or more pressure measurements are displayed on said display as pass/fail for each of said one or more pressure measurements.

6. The device of claim 2, wherein said one or more pressure measurements are displayed on said display on a graphic representation of a human foot.

7. The device of claim 2, wherein said replica human foot portion has an increased lateral shape and size over an ideal foot size.

8. The device of claim 7, wherein said increased lateral shape and size is increased at a pinky toe portion, at a lateral ball portion, at a fifth metatarsal portion, and at a medial ball portion.

9. The device of claim 8, wherein said pinky toe portion lateral increase is in the range of 1 to 6 millimeters;
wherein said lateral ball portion lateral increase is in the range of 1 to 8 millimeters;
wherein said fifth metatarsal portion lateral increase is in the range of 1 to 6 millimeters; and
wherein said medial ball portion lateral increase is in the range of 1 to 8 millimeters.

10. The device of claim 8, wherein said pinky toe portion lateral increase is 5 millimeters;
wherein said lateral ball portion lateral increase is 5 millimeters; wherein said fifth metatarsal portion lateral increase is 4 millimeters; and
wherein said medial ball portion lateral increase is 3 millimeters.

11. The device of claim 2, wherein said replica human foot portion comprises a handle.

12. A shoe fit measuring device, comprising:
a replica human foot portion;
one or more pressure sensors;
one or more distance gauges;
an electronic data processing unit; and
a display;
wherein said one or more pressure sensors and said one or more distance gauges are configured to determine whether a plurality of shoes being fit tested are made to size;
wherein said replica human foot portion is configured to be inserted into said plurality of shoes being fit tested;
wherein said one or more pressure sensors are operatively engaged with said replica human foot portion, such that when said replica human foot portion is inserted into said plurality of shoes being fit tested one or more pressure measurements are taken;
wherein said one or more distance gauges are operatively engaged with said replica human foot portion;
wherein said one or more distance gauges are configured to measure one or more open spaces between said replica human foot portion and said plurality of shoes being fit tested when said replica human foot portion is inserted into said plurality of shoes being fit tested, such that one or more distance measurements are taken;
wherein said display is in communication with said one or more pressure sensors and said one or more distance gauges and is configured to display said one or more pressure measurements and said one or more distance measurements; and
wherein said one or more pressure measurements and said one or more distance measurements are stored on a memory of said electronic data processing unit.

13. The device of claim 12, wherein said one or distance gauges are three distance gauges: a heel distance gauge; a toe length distance gauge; and a toe depth distance gauge;

wherein said one or more pressure sensors are eight pressure sensors: a pinky toe pressure sensor; a lateral ball pressure sensor; a fifth metatarsal pressure sensor; a lateral heel pressure sensor; a medial heel pressure sensor; a navicular pressure sensor, a medial ball pressure sensor; and a big toe pressure sensor.

14. The device of claim 12, wherein said one or more pressure measurements are displayed on said display as pass/fail on a graphic representation of a human foot for each of said one or more pressure measurements.

15. The device of claim 12, wherein said replica human foot portion has an increased lateral shape and size over an ideal foot size.

16. The device of claim 15, wherein said increased lateral shape and size is increased at a pinky toe portion, at a lateral ball portion, at a fifth metatarsal portion, and at a medial ball portion.

17. The device of claim 16, wherein said pinky toe portion lateral increase is in the range of 1 to 6 millimeters;
wherein said lateral ball portion lateral increase is in the range of 1 to 8 millimeters;
wherein said fifth metatarsal portion lateral increase is in the range of 1 to 6 millimeters; and
wherein said medial ball portion lateral increase is in the range of 1 to 8 millimeters.

18. The device of claim 17, wherein said pinky toe portion lateral increase is 5 millimeters;
wherein said lateral ball portion lateral increase is 5 millimeters; wherein said fifth metatarsal portion lateral increase is 4 millimeters; and
wherein said medial ball portion lateral increase is 3 millimeters.

19. A shoe fit measuring device, comprising:
a replica human foot portion;
one or more pressure sensors; and
one or more distance gauges;
wherein said one or more pressure sensors and said one or more distance gauges are configured to determine whether a plurality of shoes being fit tested are made to size;
wherein said replica human foot portion is configured to be inserted into said plurality of shoes being fit tested;
wherein said one or more pressure sensors are operatively engaged with said replica human foot portion, such that when said replica human foot portion is inserted into said plurality of shoes being fit tested one or more pressure measurements are taken;
wherein said one or more distance gauges are operatively engaged with said replica human foot portion;
wherein said one or more distance gauges are configured to measure one or more open spaces between said replica human foot portion and said plurality of shoes being fit tested when said replica human foot portion is inserted into said plurality of shoes being fit tested, such that one or more distance measurements are taken;
wherein said replica human foot portion has an increased lateral shape and size over an ideal foot size at a pinky toe portion, at a lateral ball portion, at a fifth metatarsal portion, and at a medial ball portion;
wherein said pinky toe portion lateral increase is 5 millimeters;
wherein said lateral ball portion lateral increase is 5 millimeters;
wherein said fifth metatarsal portion lateral increase is 4 millimeters; and
wherein said medial ball portion lateral increase is 3 millimeters.

* * * * *